United States Patent Office 3,323,984
Patented June 6, 1967

3,323,984
METHOD AND COMPOSITION FOR
CONTROLLING FUNGI
Karoly Szabo, Pleasantville, N.Y., and George P. Willsey, Jr., Geneva, Switzerland, assignors to Stauffer Chemical Company, New York, N.Y., a Delaware corporation
No Drawing. Filed Sept. 13, 1963, Ser. No. 308,660
26 Claims. (Cl. 167—22)

This is a continuation-in-part of my co-pending application, Ser. No. 131,085 filed Aug. 14, 1961 and abandoned as of the filing date of the present application.

This invention relates to the control of microorganisms such as fungi and the like. More particularly, the invention pertains to the formulation and use of fungicidal compositions having as their active component a completely halogenated acetone or the hydrate or an alcoholate thereof, the halogens being fluorine or a combination of fluorine and chlorine and the alcoholate being derived from an aliphatic alcohol.

The completely halogenated acetone and alcoholates thereof used in preparing the fungicidal compositions of the present invention can be pictorially represented by the following general formulae:

(I) 

(II) 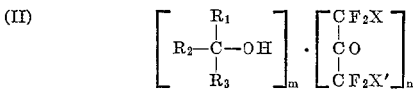

wherein each of $R_1$, $R_2$ and $R_3$ represents hydrogen, an aliphatic radical of from 1 to 18 carbon atoms, an aralkyl radical as exemplified by benzyl, phenethyl, phenylpropyl, naphthylmethyl and the like, an aromatic hydrocarbon radical as exemplified by phenyl, nitrophenyl, chlorophenyl, bromophenyl, alkoxylphenyl, naphthyl, chloronaphthyl and the like, and a functional moiety as typified by a carboxylic ester group, a carboxamido group, cyano, an amino group including its N-substituted lower alkyl and phenyl derivatives, hydroxy and the ethers thereof, mercapto and the thioethers thereof and a heterocyclic radical in which the heterocyclic nucleus has from 5 to 6 members while taken together any two of $R_1$, $R_2$ and $R_3$ can complete a non-aromatic carbocyclic ring system of from 5 to 6 carbon atoms, it being further provided that the aforesaid radicals may have attached thereto at least one member selected from the group consisting of nitro, lower alkoxycarbonyl, thiocyanato, an acetamido group, formyl, oxo, cyano, chloro, bromo, fluoro, hydroxy and the ethers thereof, phenyl, lower tertiary amino, mercapto and the thioethers thereof, sulfoxide, sulfone or a heterocyclic radical in which the heterocyclic nucleus has from 5 to 6 members, X and X′ represent fluorine or chlorine, $n$ is an integer of from 1 to 6 and $m$ is an integer of from 1 to 3. Specific values which may be assigned to $R_1$, $R_2$ and $R_3$ of the above given formula are set forth in the following list:

*Alkyl radicals*

| | |
|---|---|
| methyl | 3-ethoxypropyl |
| ethyl | 3-nitropropyl |
| n-propyl | formylmethyl |
| isopropyl | 3-hydroxy-2-oxo-propyl |
| n-pentyl | ethoxycarbonylethyl |
| isopentyl | 2-acetomidoethyl |
| isobutyl | 2-N,N-dimethylacetomido- |
| tert.-butyl | ethyl |
| n-hexyl | thiocyanatoethyl |
| isohexyl | phenethyl |
| n-nonyl | 3-ethylmercaptopropyl |
| n-decyl | 2-fluoroethyl |
| bromoethyl | 2-cyanoethyl |
| chloroethyl | 2-butoxypropyl |
| 2-nitrobutyl | 2-chloro-2-nitropropyl |
| 2-dimethylaminoethyl | 2,3-dibromopropyl |
| 2-diethylaminoethyl | 3,3,3-trichloro-2-nitropropyl |
| 2,3-dihydroxypropyl | 2-propoxyethyl |
| 2-methoxyethyl | |

*Ethylenically unsaturated radicals*

| | |
|---|---|
| allyl | 5-hexenyl |
| methallyl | 9-decenyl |
| ethallyl | 2-methyl-1-hexenyl |
| 1-butenyl | 3-ethyl-1-hexenyl |
| 2-butenyl | 4,4-diethyl-1-hexenyl |
| 3-butenyl | 1-heptenyl |
| 2-methyl-1-butenyl | 6-heptenyl |
| 2-methyl-3-butenyl | 4,4-dimethyl-1-octenyl |
| 1-pentenyl | 4-ethyl-2-octenyl |
| 2-pentenyl | 1-octenyl |
| 3-pentenyl | 2-octenyl |
| 4-pentenyl | 3-octenyl |
| 2-methyl-1-pentenyl | 4-octenyl |
| 2-ethyl-1-pentenyl | 7-ocetenyl |
| 2-ethyl-4-pentenyl | 4,4-dimethyl-2-octenyl |
| 3,3-dimethyl-1-pentenyl | 1-nonenyl |
| 1-hexenyl | 2-nonenyl |
| 2-hexenyl | 1-decenyl |
| 3-hexenyl | 8-nonenyl |
| 4-hexenyl | 2-decenyl |

*Acetylenically unsaturated radicals*

| | |
|---|---|
| 1-propynl | 7-octynyl |
| 2-propynyl (propargyl) | 2-ethyloctynyl-3 |
| 1-hexynyl | 1-bromo-2-hexynyl |
| 3-hexynyl | 3,5-dimethyl-1-hexynyl |
| 1-octynyl | |

*Non-aromatic carbocyclic radicals*

| | |
|---|---|
| cyclopentyl | 2-cyclohexenyl |
| cyclohexyl | 3-cyclohexenyl |
| 1-cyclopentenyl | 2(3-cyclohexenyl)ethyl-3- |
| 2-cyclopentenyl | vinylcyclohexyl |
| 3-cyclopentenyl | 4-ethyl-1-cyclohexenyl |
| 4-vinylcyclohexyl | 4-isopropyl-2-cyclohexenyl |
| 1-cyclohexenyl | |

*Phenyl and naphthyl radicals*

| | |
|---|---|
| phenyl | 2,4-dichlorophenyl |
| 2-chlorophenyl | 4-tolyl |
| 4-chlorophenyl | 4-chloromethylphenyl |
| 4-fluorophenyl | 1-naphthyl |
| 4-hydroxyphenyl | 4-chloro-1-naphthyl |
| pentachlorophenyl | 2-naphthyl |
| 4-cyanophenyl | 1-methyl-2-naphthyl |
| 4-diethylaminophenyl | 4-ethoxyphenyl |

*Heterocyclic radicals*

| | |
|---|---|
| 2-pyridyl | 2-thiazolidyl |
| 3-pyridyl | 4,5-dimethyl-2-thiazolidyl |
| oxazolyl | 2-pyrimidyl |
| thiazolyl | 4-phenyl-2-oxazolyl |
| diazinyl | pyranyl |
| diazolyl | pyrrolyl |
| triazinyl | pyrrolidyl |

With respect to the hydrates and alcoholates, it has been our finding that such derivatives can be realized by bringing the reactants, i.e. the halogenated ketone and water or requisite alcoholic component, into contact with one another. The reaction is conveniently carried out in the presence of a normally liquid organic solvent, and in this connection reference is made to the lower ketones as exemplified by acetone, methylethylketone and the like and saturated aliphatic and aromatic hydrocarbons as well as their normally liquid chlorinated derivatives such as methylene dichloride, carbon tetrachloride, ethylene dichloride, m-dichlorobenzene, etc. It is to be pointed out, however, that the reaction is not dependent upon any particular solvent and in fact the reactants themselves may provide their own solvent media. For the most part, the components tend to combine exothermically, particularly when the alcohol is a low molecular weight alcohol. In any event, the reaction temperature can be readily controlled by applying a circulating current around the reaction vessel. For optimum results, it is recommended that the temperature be maintained in the neighborhood of 10–40° C.

Although we have not as yet determined the precise chemical configuration of the herein described complexes, the evidence accumulated thus far indicates them to a type of addition product since their formation is not accompanied by the elimination or formation of any detectable by-products. The infrared spectrum of the adducts points to their being carbonyl adducts of the halogenated acetone, i.e. a hemi-ketal type of structure. It is to be understood, however, that such suggestion as regards chemical makeup is offered merely as a theory or hypothesis and is not to be taken as an absolute opinion as to their structure.

The reaction by which the halogenated acetone alcohol adducts of the invention are prepared is within wide limits applicable to a large selection of reactants. It has, however, been our finding that the alcoholic component should be aliphatic in nature, i.e. the hydroxy function cannot be affixed to a carbon atom which is part of an aromatic ring system. Furthermore, when the hydroxy function on the alcoholic reactant is surrounded by a multiplicity of electro-negative groups, the reactivity of the hydroxy diminishes with respect to its ability to complex with fully halogenated acetone and may even be rendered inactive. In this connection, we have found 2,2,2-trichloroethanol to be inactive. Another unreactive alcoholic species is completely halogenated ethanol such as fluorinated ethanol. From what we have been able to ascertain wiht respect to this reaction, the carbon of the aliphatic carbinol should not have attached directly thereto more than two halogen atoms or a fully halogenated methyl radical. Since, as previously pointed out, the reaction by which the compounds of the invention are realized seems to be addition of the alcoholic component to the carbonyl function of the acetone, it will be appreciated that the reacting species cannot be excessively sterically hindered. With respect to this limitation, the groups affixed directly to the carbon of the carbinol should not be too bulky. In this connection, we were unable to prepare the adduct of tri-tert.-butyl carbinol with sym. dichlorotetrafluoroacetone.

It has been noted elsewhere herein that the halogenated acetone-alcohol adducts of the invention are systemic toxicants and the discovery of this property greatly enhances their utility and value. As those skilled in the art are aware, a systemic biocide is taken up internally by the organism to which it is applied and lodges in the tissues of the organism while still retaining its toxicological properties. Obviously, systemic toxicants are not subject to weathering when applied to plants since they are confined within the interstices of the plant tissues which are thereby internally immunized against the attack of invading microorganisms such as fungi and bacteria.

We are aware that certain halogenated acetones have been proposed for use in combating fungi and related pest microorganisms and in this connection various chloroacetones have found some utility, particularly the chloro and sym. dichloroacetones. It is to be pointed out, however, that chlorinated acetones do not operate via a systemic mechanism but exert their activity through direct local action on the microorganisms. Even the completely halogenated acetone-alcoholates do not as a class exhibit a general or universal fungicidal activity. We have, for instance, prepared numerous adducts of alcohols with 1,1,3-trichloro-1,3,3-trifluoroacetone with several alcoholic components and were surprised to find that such materials did not exhibit the systemic activity which characterizes the particular fluorinated and chlorofluorinated acetone alcoholates of the invention. We have not as yet been able to explain this unusual and unexpected behavior.

For specific instructions and directions for preparing the compounds of the invention, reference is now made to the following examples which are inserted only for the purpose of illustrating the invention. It will be appreciated by those having skill in the art to which the invention pertains that various modifications therefrom can be made without departing from the scope and spirit thereof.

EXAMPLE 1

*Sym.-dichlorotetrafluoroacetone hydrate*

Sym.-dichlorotetrafluoroacetone is hydroscopic and readily forms hydrates containing varying ratios of water to ketone. However, the most stable hydrate contains approximately 2 moles of ketone to 5 moles of water and is the most important of the hydrated forms of the compound. This hydrated derivative can be prepared in the following manner.

10 g. of sym.-dichlorotetrafluoroacetone and 2.75 ml. of water were placed in a container while the reaction temperature was maintained below 40° C. There was formed a colorless oil which solidified at −7° C. It was purified by distillation, the portion boiling at 106° C. being collected.

Sym.-dichlorotetrafluoroacetone is prepared by the fluorination of hexachloroacetone in the presence of metal halide catalysts. The reaction is described in U.S. Patent 2,917,546.

EXAMPLE 2

*Sym.-dichlorotetrafluoroacetone methyl alcoholate*

10 g. of sym.-dichlorotetrafluoroacetone was placed in a container and cooled to $-10°$ C. at which point was added dropwise 2.2 ml. of anhydrous methanol. The reaction took place spontaneously and a complex came down in the form of a colorless oil which was purified by distillation; boiling point 104° C.

EXAMPLE 3

*Sym.-dichlorotetrafluoroacetone lauryl alcoholate*

The procedure in this example paralleled that of the second example. In this instance 18.6 g. of lauryl alcohol was placed in a small Erlenmayer flask and 10.75 g. of sym.-dichlorotetrafluoroacetone was added all in one portion. After the slightly exothermic reaction was completed, there remained a colorless clear oil.

EXAMPLE 4

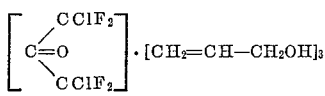

17.5 g. of allylalcohol was gradually added to a mixture of 20.0 g. of sym.-dichlorotetrafluoroacetone dissolved in 60 ml. of methylene dichloride, the temperature being maintained around 40° C. during the addition. The mixture was allowed to cool to room temperature and then subjected to fractional distillation at normal pressure. The desired product boiled at 108° C. and was a colorless oil having an $N_D^{25}$ of 1.4045 and was obtained in essentially quantitative yield. The chemical and instrumental analyses showed the ratio of the reactants as above indicated by the formula.

EXAMPLE 5

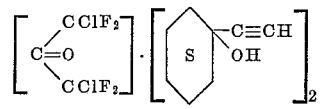

This preparation was carried out in accordance with the procedure as above spelled out in Example 4. The purified product was obtained in the form of a colorless oil, boiling at 70–73° C./15–20 mm. The $N_D^{25}$ of the purified product is 1.4475.

Using the same method and procedure as given in the previous examples, the following compounds were prepared:

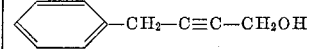

| Example No. | Halogenated Ketone | Alcoholic Component | Ratio | Physical Properties |
|---|---|---|---|---|
| 6 | 5FK | Ethyl alcohol | 1:3 | $N_D^{25}$=1.3565. |
| 7 | 6FK | Ethyl alcohol | | |
| 8 | 4FK | Benzyl alcohol | 1:2 | Colorless oil, $N_D^{25}$=1.4921. |
| 9 | 4FK | Cyclohexanol | 1:2 | Light yellow oil, $N_D^{25}$=1.4415. |
| 10 | 4FK | 1-octanol | 1:1 | Light brown oil, $N_D^{25}$=1.4132. |
| 11 | 4FK | Tert.-butanol | 1:1 | Brown oil, $N_D^{25}$=1.3940. |
| 12 | 4FK | 1,2-propanediol | 2:1 | Colorless oil, $N_D^{25}$=1.4045. |
| 13 | 4FK | 1-octadecanol | 1:2 | Waxy solid, m.p. 51° C. |
| 14 | 4FK | Ethynylcyclohexanol | 2:1 | Light brown oil, $N_D^{25}$=1.4250. |
| 15 | 4FK | Glycerol | 1:1 | Colorless viscous oil, $N_D^{25}$=1.4250. |
| 16 | 4FK | ⌬—CH₂—C≡C—CH₂OH | 1:2 | Light brown oil, $N_D^{25}$=1.4712. |
| 17 | 4FK | CH₃CH₂CH₂CH₂S—CH(OH)—CCl₃ | 1:1 | Light yellow oil, $N_D^{25}$=1.4490. |
| 18 | 4FK | BrCH₂CH₂OH | 1:1 | Light brown oil, $N_D^{25}$=1.4280. |
| 19 | 4FK | ClCH₂CH₂OH | 1:1 | Colorless oil, $N_D^{25}$=1.4120. |
| 20 | 4FK | CH₃—CH₂—CH(NO₂)—CH₂OH | 1:1 | Yellow oil, $N_D^{25}$=1.4156. |
| 21 | 4FK | (C₂H₅)₂N—CH₂CH₂O—CH₂CH₂OH | 2:1 | Viscous yellow oil, $N_D^{25}$=1.4391. |
| 22 | 4FK | NO₂·C(CH₂OH)₃ | 3:1 | Pale yellow liquid, $N_D^{25}$=1.4156. |

| Example No. | Halogenated Ketone | Alcoholic Component | Ratio | Physical Properties |
|---|---|---|---|---|
| 23 | 4FK | N(CH₂CH₂OH)₃ | 3:1 | White solid, m.p. 75° C. |
| 24 | 4FK | (CH₃)₂CH-N(-CH(CH₃)₂)-CH₂CH₂OH | 1:1 | White solid, m.p. 85° C. |
| 25 | 4FK | C₂H₅-C(NO₂)(CH₂OH)₂ | 2:1 | Viscous pale yellow oil, $N_D^{25}$=1.4179. |
| 26 | 4FK | C₂H₅-N(CH₂CH₂OH)₂ | 2:1 | White solid, m.p. 130° C. |
| 27 | 4FK | (CH₃)₂N-CH₂CH₂OH | 1:1 | White solid, m.p. 74° C. |
| 28 | 4FK | C₆H₅-N(CH₂CH₂OH)₂ | 2:1 | White solid, m.p. 84° C. |
| 29 | 5FK | H₂O | | Not isolated. |
| 30 | 4FK | (CH₃)₂N-CH₂-CH(OH)-CH₃ | 1:1 | White solid, m.p. 53° C. |
| 31 | 4FK | (C₄H₉)₂N-CH₂CH₂OH | 1:1 | Yellow oil, m.p. 22° C., $N_D^{25}$=1.4366. |
| 32 | 4FK | [CH₃(CH₂)₃CH-CH₂]₂NCH₂CH₂OH | 1:1 | Viscous red oil, $N_D^{25}$=1.4462. |
| 33 | 4FK | (CH₂CH₂)(CH₂CH₂)N-CH₂CH₂OH (with C₂H₅) | 1:1 | White solid, m.p. 80° C. |
| 34 | 4FK | CH₃-N(CH₂CH₂OH)₂ | 2:1 | White solid, m.p. 80° C. |
| 35 | 4FK | C₄H₉N(CH₂CH₂OH)₂ | 2:1 | Pink solid, m.p. 90° C. |
| 36 | 4FK | imidazole-N-CH₂CH₂OH (C-CH₃) | 1:1 | Viscous yellow oil, $N_D^{25}$=1.4718. |
| 37 | 4FK | H-C(=O)-NHCH₂CH₂OH | 1:1 | Pale yellow oil, $N_D^{25}$=1.4320. |
| 38 | 5FK | Cl-C₆H₃(Cl)-O-CH₂CH₂OH | 1:1 | Colorless oil. |
| 39 | 5FK | Cl-C₆H₄-C(=O)-O-CH₂CH₂OH | 1:1 | Do. |
| 40 | 4FK | morpholine-N-CH₂CH(OH)CH₃ | 1:1 | Light yellow oil, $N_D^{25}$=1.4373. |

| Example No. | Halogenated Ketone | Alcoholic Component | Ratio | Physical Properties |
|---|---|---|---|---|
| 41 | 4FK | O(CH₂CH₂)₂N—CH₂CH₂OH (morpholine-N-CH₂CH₂OH) | 1:1 | Yellow oil, $N_D^{25}=1.4448$. |
| 42 | 4FK | HO—C(CH₃)₂—CN | 1:1 | Yellow oil, $N_D^{25}=1.3997$. |
| 43 | 6FK | NO₂—C₆H₄—CH₂OH | 1:1 | Yellow solid, m.p. 76° C. |
| 44 | 6FK | CH₃OCH₂CH₂OH | 1:1 | Colorless oil, $N_D^{25}=1.3307$. |
| 45 | 6FK | (pyridyl)—CH₂CH₂OH | 1:1 | Brown oil, $N_D^{25}=1.4135$. |
| 46 | 6FK | phthalazinone-N—CH₂OH | 1:1 | Grey solid, m.p. 90° C. |
| 47 | 6FK | C₂H₅S—CH₂CH₂OH | 1:1 | Yellow oil, $N_D^{25}=1.3767$. |
| 48 | 6FK | furfuryl alcohol (CH=CH—O—CH=CH—CH₂OH) | 1:1 | Light yellow oil, $N_D^{25}=1.3757$. |
| 49 | 6FK | (pyridyl)—CH₂OH | 1:1 | Viscous light yellow oil, $N_D^{25}=1.4148$. |
| 50 | 6FK | (pyridyl)—CH₂CH₂CH₂OH | 1:1 | Light brown oil, $N_D^{25}=1.4276$. |
| 51 | 6FK | CH₂—C(C≡CH)(OH)—cyclic (1-ethynylcyclopentanol) | -------- | Yellow oil, $N_D^{25}=1.4430$. |
| 52 | 4FK | C₂H₅SO₂CH₂CH₂OH | 1:1 | Colorless, viscous oil; $N_D^{25}=1.4350$. |
| 53 | 4FK | [HOCH₂CH₂)₂NCH₂]₂ | 2:1 | Yellow glassy product. |
| 54 | 4FK | [HOCH₂CH₂)₂NCH₂]₂ | 4:1 | White semi-solid. |
| 55 | 6FK | HOCH₂(HCOH)₄—CH₂OH | 6:1 | Light brown oil, $N_D^{25}=1.3522$. |
| 56 | 5FK | 1,4-dioxane-2-CH₂OH (CH₂—CH₂—O—CH₂—CH(CH₂OH)—) | 1:2 | Colorless oil, $N_D^{25}=1.3948$. |
| 57 | 4FK | Sucrose | -------- | Syrupy yellow oil, $N_D^{25}=1.4275$. |
| 58 | 4FK | HO—CH₂—C(O)—N(CH₂CH₂)₂ | 1:1 | Brown oil, $N_D^{25}=1.4503$. |
| 59 | 6FK | H₂O | -------- | Colorless liquid. |

Note.—Halogenated Ketone:

$$4FK = \underset{CF_2Cl}{\overset{CF_2Cl}{C}}=O \qquad 5FK = \underset{CF_2Cl}{\overset{CF_3}{C}}=O \qquad 6FK = \underset{CF_3}{\overset{CF_3}{C}}=O$$

In carrying out systemic fungicidal tests, 60 ml. of the compound undergoing evaluation is diluted to 50 parts per million and then placed in small tubes. A pinto bean plant is next inserted in each tube using a cotton plug to support the seedling and also to retard evaporation. After 48 hours, two plants are inoculated with bean rust and the other two are inoculated with powdery mildew. Comparison between the treated and untreated plants is then made and the results evaluated.

Tests of fungicidal activity on plant foliage are conducted to show the protectant activity of the compound. The procedure involves spraying with known concentrations of the compound. The plants are allowed to dry and then inoculated with the spore suspension of the desired fungus. Plants are then held in conditions favorable for infection and development of each disease. After a suitable time, the plants are inspected and the control is rated, expressing the amount of disease as a percentage of that on unprotected plants.

The soil drench evaluation test is carried out by mixing or injecting a compound into the soil in the form of a water drench. In general, this procedure follows the mixing and injection tests except that the manner of application is in the form of a drenching bath or spray.

Foliage fungicide tests indicate protectant action as well as eradicant and leaf systemic action. The particular action which is operative is ascertained in the evaluation tests. Pinto bean plants are sprayed at 1000, 500 and 100 parts per million. The active component is dissolved in water, and for this purpose, it is recommended that a surface active agent or wetting agent be employed to facilitate formulation of the dispersions. After the sprayed plants are dried they are inoculated with bean rust or powdery mildew spores; rust infection requires overnight treatment in the mist chamber following inoculation. Results are read at 100 which signifies no pustule or mildew; ++++ which indicated 75–100% control; +++ 50–75% control; ++ 25–50% control and 0 no visible control.

The results of carrying out the aforesaid tests and evaluations with representative compounds falling within the present invention are set forth in the tables below: The numbers indicate complete control at that concentration in parts per million. Numbers in parentheses indicate partial control.

In addition to the above described test procedures, the following special tests and evaluations were carried out

TABLE I

| Example No. | Test Tube Systemic | | Soil Drench Test | |
|---|---|---|---|---|
| | Rust | Powdery Mildew | Rust | Powdery Mildew |
| Sym.-dichlorotetrafluoro-acetone | (.13) | 10 | (.023) | (.75) |
| 1 | (.5) | 5 | (.188) | 3 |
| 2 | (.25) | 5 | (.047) | (3) |
| 3 | 1 | 10 | (.375) | 13 |
| 11 | 5 | >5 | 1.5 | ---------- |
| 10 | 5 | 25 | 0.75 | ---------- |
| 13 | 10 | 50 | 3.0 | ---------- |
| 4 | 5 | 25 | 0.75 | ---------- |
| 12 | 5 | 25 | 0.75 | ---------- |
| 15 | 5 | 50 | 0.75 | ---------- |
| 20 | 5 | 25 | ---------- | ---------- |
| 22 | 5 | >50 | ---------- | ---------- |
| 54 | 10 | 25 | 0.375 | ---------- |
| 8 | 5 | 25 | 0.75 | ---------- |
| 16 | 5 | 10 | 1.5 | ---------- |
| 9 | 5 | 25 | 1.5 | ---------- |
| 26 | 5 | 50 | ---------- | ---------- |
| 53 | 5 | 10 | 1.5 | 6 |
| 18 | 5 | 25 | ---------- | ---------- |
| 28 | 1 | 10 | ---------- | ---------- |
| 59 | 1 | 5 | ---------- | ---------- |
| 7 | 0.5 | 5 | ---------- | ---------- |
| 29 | 1 | 5 | ---------- | ---------- |
| 6 | 1 | 5 | ---------- | ---------- |

TABLE II

| Example No. | Foliage Spray | | | | | | | | |
|---|---|---|---|---|---|---|---|---|---|
| | Rust | | | Powdery Mildew | | | Weathering Rust | | |
| | 1,000 | 500 | 100 | 1,000 | 500 | 100 | 1,000 | 500 | 100 |
| Sym.-dichlorotetrafluoro-acetone | 100 | 100 | 100 | ++++ | ++ | 0 | ---- | ---- | ---- |
| 1 | 100 | 100 | ++++ | ++++ | ++++ | + | ---- | ---- | ---- |
| 2 | 100 | 100 | 100 | ++++ | ++++ | ++ | ---- | ---- | ---- |
| 3 | 100 | 100 | ++++ | ++++ | + | ---- | 100 | 100 | 100 |
| 11 | 100 | 100 | ++++ | ---- | ---- | ---- | 100 | 100 | 100 |
| 10 | 100 | 100 | ++++ | ---- | ---- | ---- | ---- | ---- | ---- |
| 13 | 100 | 100 | ++++ | ---- | ---- | ---- | 100 | 100 | ++++ |
| 4 | 100 | 100 | ++++ | ---- | ---- | ---- | 100 | 100 | 100 |
| 12 | 100 | 100 | 100 | ---- | ---- | ---- | 100 | 100 | 100 |
| 15 | 100 | 100 | ++++ | ++++ | ---- | ---- | 100 | 100 | ---- |
| 20 | 100 | 100 | 100 | ---- | ---- | ---- | ---- | ---- | ---- |
| 22 | 100 | 100 | 100 | ++++ | ---- | ---- | 100 | 100 | 100 |
| 54 | 100 | 100 | ++++ | +++ | ---- | ---- | ++++ | ++++ | ++ |
| 8 | 100 | 100 | ++++ | ---- | ---- | ---- | 100 | 100 | + |
| 16 | 100 | 100 | +++ | ---- | ---- | ---- | 100 | 100 | ++++ |
| 9 | 100 | 100 | ++++ | ---- | ---- | ---- | ---- | ---- | ---- |
| 26 | 100 | 100 | 100 | ++++ | ++++ | ---- | 100 | 100 | 100 |
| 53 | 100 | 100 | 100 | ++++ | ++ | ---- | 100 | 100 | 100 |
| 18 | 100 | 100 | 100 | ++++ | + | ---- | ---- | ---- | ---- |
| 28 | 100 | 100 | 100 | ++++ | + | ---- | ---- | ---- | ---- |
| 59 | 100 | 100 | 100 | 100 | 100 | +++ | ++++ | +++ | ++ |
| 7 | 100 | 100 | 100 | 100 | ++++ | ++ | ++++ | +++ | + |
| 29 | 100 | 100 | 100 | 100 | 100 | ++++ | 100 | 100 | 100 |
| 6 | 100 | 100 | 100 | 100 | ++++ | +++ | 100 | 100 | 100 | with sym.-dichlorotetrafluoroacetone which, as previously pointed out, is the parent structure of the herein contemplated compounds.

(1) *Seed treatment.*—Pinto bean seed was treated with 0.1 to 2.0 oz. of sym.-dichlorotetrafluoroacetone/100 lbs. seed. Partial control of pinto bean rust was obtained with the 1.0 and 2.0 oz. treatment.

(2) *Wheat rust.*—Baart 46 wheat was sprayed with sym.-dichlorotetrafluoroacetone before and after inoculation with rust spores with the following results:

TABLE III

| Concentration of sym.-dichlorotetra-fluoroacetone, p.p.m. | Percent control sprayed 1 day before inoculation | Percent control sprayed 2 days after inoculation |
|---|---|---|
| 500 | 92 | 87 |
| 100 | 33 | 0 |
| 50 | 0 | 0 |

(3) *Grass rust.*—Sprays of 1000 p.p.m. eradicated rust and prevented further infection in greenhouse trials.

(4) *Lower concentrations on foliage.*—Sym.-dichlorotetrafluoroacetone was sprayed on pinto bean for rust control with the following results:

| | Spray concentration (p.p.m.) | | | | | |
|---|---|---|---|---|---|---|
| | 1,000 | 500 | 100 | 50 | 25 | 10 |
| Control | 100 | 100 | 100 | ++++ | ++++ | ++ |

(5) *Leaf systemic spray.*—Primary leaves of pinto beans were sprayed with sym.-dichlorotetrafluoroacetone. Later, the secondary leaves developed and were inoculated (developing secondary leaves were covered when primary leaves were sprayed).

| | Concentration on 10 leaves, (p.p.m.) | | | | |
|---|---|---|---|---|---|
| | 1,000 | 500 | 100 | 50 | 25 |
| Control of rust on secondary leaves | 100 | 100 | 75 | 0 | 0 |

We claim:
1. A method of inhibiting the growth of fungi comprising applying thereto a fungicidally effective amount of a compound selected from the class consisting of a fully halogenated acetone of the formula

wherein X and X' are selected from the class consisting of chlorine and fluorine and the hydrates and aliphatic alcoholates of said fully halogenated acetone.

2. A method of inhibiting the growth of fungi comprising applying thereto a fungficidally effective amount of the compound
    hexafluoroacetone·hydrate 3. A method of inhibiting the growth of fungi comprising applying thereto a fungicidally effective amount of the compound
    chloropentafluoroacetone·hydrate 4. A method of inhibiting the growth of fungi comprising applying thereto a fungicidally effective amount of the compound
    sym.-dichlorotetrafluoroacetone·lauryl alcoholate 5. A method of inhibiting the frowth of fungi comprising applying thereto a fungicidally effective amount of the compound

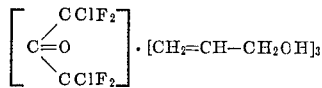

6. A method of inhibiting the growth of fungi comprising applying thereto a fungicidally effective amount of the compound

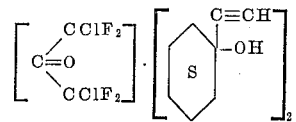

7. A method of inhibiting the growth of fungi comprising applying thereto a fungicidally effective amount of the compound

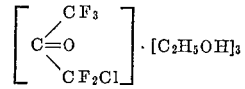

8. A method of inhibiting the growth of fungi comprising applying thereto a fungicidally effective amount of the compound

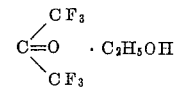

9. A method of inhibiting the growth of fungi comprising applying thereto a fungicidally effective amount of the compound

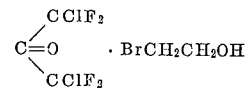

10. A method of inhibiting the growth of fungi comprising applying thereto a fungicidally effective amount of the compound

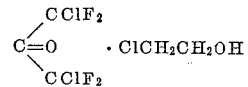

11. A method of inhibiting the growth of fungi comprising applying thereto a fungicidally effective amount of the compound

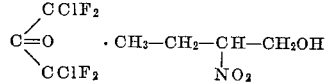

12. A method of inhibiting the growth of fungi comprising applying thereto a fungicidally effective amount of the compound

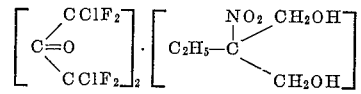

13. A method of inhibiting the growth of fungi comprising applying thereto a fungicidally effective amount of the compound

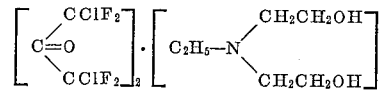

14. A method of inhibiting the growth of fungi comprising applying thereto a fungicidally effective amount of the compound

15. A method of inhibiting the growth of fungi comprising applying thereto a fungicidally effective amount of the compound

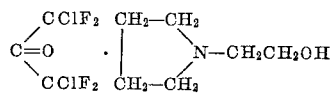

16. A method of inhibiting the growth of fungi comprising applying thereto a fungicidally effective amount of the compound

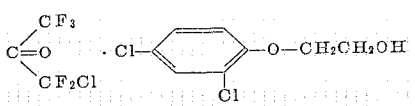

17. A method of inhibiting the growth of fungi comprising applying thereto a fungicidally effective amount of the compound

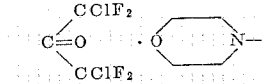

18. A method of inhibiting the growth of fungi comprising applying thereto a fungicidally effective amount of the compound

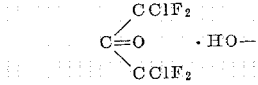

19. A method of inhibiting the growth of fungi comprising applying thereto a fungicidally effective amount of the compound

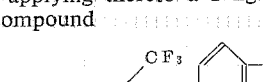

20. A method of inhibiting the growth of fungi comprising applying thereto a fungicidally effective amount of the compound

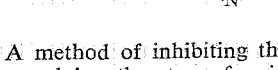

21. A method of inhibiting the growth of fungi comprising applying thereto a fungicidally effective amount of the compound

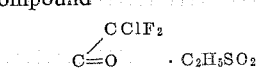

22. A method of inhibiting the growth of fungi comprising applying thereto a fungicidally effective amount of the compound

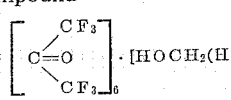

23. A method of inhibiting the growth of fungi comprising applying thereto a fungicidally effective amount of the compound

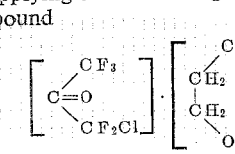

24. A method of inhibiting the growth of fungi comprising applying thereto a fungicidally effective amount of the compound

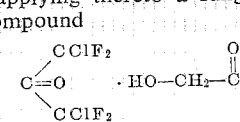

25. A method of inhibiting the growth of fungi comprising applying thereto a fungicidally effective amount of the compound

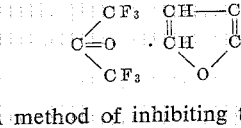

26. A method of inhibiting the growth of fungi comprising applying thereto a fungicidally effective amount of the compound

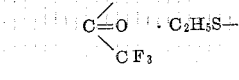

References Cited
UNITED STATES PATENTS

| | | | |
|---|---|---|---|
| 2,763,097 | 9/1956 | Meuli | 47—58 |
| 2,911,414 | 11/1959 | Simmons | 260—327 |
| 3,024,159 | 3/1962 | Bollenback et al. | 162—161 |
| 3,238,090 | 3/1966 | Szabo et al. | 167—22 |

LEWIS GOTTS, *Primary Examiner.*

S. K. ROSE, *Assistant Examiner.*